United States Patent [19]
Stageberg et al.

[11] Patent Number: 6,018,862
[45] Date of Patent: Feb. 1, 2000

[54] THIN-FILM MAGNETIC RECORDING HEAD USING A PLATED METAL GAP LAYER

[75] Inventors: Frank Stageberg, Edina; Kenneth P. Ash, Chanhassen; Feng Wang, Lakeville; Sara L. Gordon, Minneapolis; Wojciech Worwag, Chanhassen, all of Minn.; Katrina Rook, Orangeburg, N.Y.; Kevin Welsh, Plymouth, Minn.

[73] Assignee: Seagate Technology, Inc., Scotts Valley, Calif.

[21] Appl. No.: 09/159,330

[22] Filed: Sep. 23, 1998

Related U.S. Application Data

[60] Provisional application No. 60/061,273, Oct. 7, 1997, and provisional application No. 60/078,904, Mar. 20, 1998.

[51] Int. Cl.$^7$ .................................................. G11B 5/127
[52] U.S. Cl. ........................... 29/603.14; 29/603.07; 29/603.13; 29/603.15; 29/603.16; 360/126
[58] Field of Search .................... 29/603.07, 603.13, 29/603.14, 603.15, 603.16; 360/120, 125, 126

[56] References Cited

U.S. PATENT DOCUMENTS

| | | |
|---|---|---|
| 3,641,281 | 2/1972 | Varadi et al. ..................... 179/100.2 |
| 4,244,788 | 1/1981 | Faulkner .................................. 204/15 |
| 5,170,301 | 12/1992 | Muraoka et al. ...................... 360/120 |
| 5,438,747 | 8/1995 | Krounbi et al. .......................... 29/603 |
| 5,537,277 | 7/1996 | Kato ...................................... 360/121 |
| 5,621,596 | 4/1997 | Santini .................................. 360/126 |
| 5,700,380 | 12/1997 | Krounbi et al. ........................... 216/22 |
| 5,801,909 | 9/1998 | Gray et al. ............................. 360/126 |
| 5,809,636 | 9/1998 | Shouji et al. ........................ 29/603.14 |
| 5,901,431 | 5/1999 | Santini ................................ 29/603.14 |

Primary Examiner—Carl E. Hall
Assistant Examiner—Davide Caputo
Attorney, Agent, or Firm—Kinney & Lange

[57] ABSTRACT

A first layer of magnetic material is deposited onto a substrate to form a bottom pole of an inductive transducer. A second layer of magnetic material is plated on the first layer of magnetic material within the pole tip region to form a bottom pole extension. A layer of non-magnetic metal is then plated on the bottom pole extension to form the gap. A third layer of magnetic material is then plated on the gap layer to form the top pole extension. In one form of the invention, a mask is employed to define a good zero throat level surface to the pole tip region.

14 Claims, 5 Drawing Sheets

THIN-FILM MAGNETIC RECORDING HEAD USING A PLATED METAL GAP LAYER

CROSS-REFERENCE TO RELATED APPLICATION(S)

This invention claims priority of Provisional Application Ser. No. 60/061,273 filed Oct. 7, 1997 for "Thin-Film Magnetic Recording Head Utilizing an Electroplated or Electroless Plated Nonmagnetic Metal Gap Layer" by Katrina Rook, Kenneth P. Ash, Frank Stageberg, Kevin Welsh, Feng Wang, Sara L. Gordon, and Wojciech Worwag, and priority of Provisional Application Ser. No. 60/078,904 filed Mar. 20, 1998 for "Two Piece Pole Narrow Track Writer" by Frank E. Stageberg, Kenneth P. Ash, James K. Price, Feng Wang, Elzbieta J. Haftek, Allan E. Schultz and Richard P. Larson.

BACKGROUND OF THE INVENTION

This invention relates to thin film inductive magnetic heads having well-defined pole tip structures, and particularly to a process to efficiently and accurately manufacture such heads.

Inductive magnetic heads are used to write data to an adjacent magnetic medium. In its most basic form, an inductive head employs a pair of opposing poles, separated by a nonmagnetic gap at the pole tip region. A current-carrying coil passes between the two poles to induce a magnetic flux through the poles. The flux forms a reversible magnetic field across and adjacent to the nonmagnetic gap at the pole tip to write data into a magnetic layer of the adjacent memory medium.

Gap materials for inductive heads are non-magnetic materials, and commonly include metal oxides and metal nitrides, such as alumina ($Al_2O_3$), silicon dioxide ($SiO_2$), and silicon nitride ($Si_3N_4$). Metal oxide and nitride insulators are typically formed by a sputter-depositing technique, a chemical vapor deposition technique or a plasma-enhanced chemical vapor deposition technique; they are not capable of formation by plating, such as electroplating or electroless plating. However, in the fabrication of an inductive head, it is common to plate the poles into place. For example, it was common to plate the bottom pole on the substrate, and sputter deposit the alumina material over the bottom pole. Typically, the gap layer extended into the back region of the transducer and the coils and additional insulation material were formed in the back region of the head. The top magnetic pole was then plated over the coil and pole tip (gap) regions to complete the head. Thus, fabrication of inductive magnetic heads employed both sputter and plating techniques to form various layers in the thin-film head. These diverse techniques did not pose a problem to the fabrication of the head because different geometric configurations of the various layers required changing the masks for each layer, making it convenient to also change the process type.

As the need for more efficient inductive heads increases, magnetic flux losses need to be minimized to thereby concentrate flux in the region of the gap. One technique to minimize flux losses is use of pole extensions for the top and/or bottom poles. The gap material is sandwiched between the pole extensions so that the gap and pole extensions have identical geometric configurations. More particularly, the gap and pole extensions have identical widths and depths to define the pole tip region without sharp corners in the magnetic path that otherwise create flux leakage. For example, Cole et al., in U.S. Pat. No. 5,454,164, describes a write head employing pole extensions having identical configurations to define the pole tip region. Cole forms a lower pole layer, gap layer, and upper pole extension layer in successive steps onto the substrate and ion mills all three layers (using a photoresist mask) to a design depth into the lower pole to define the zero throat level (depth) of the pole tip region for the upper pole extension, gap and lower pole extension.

While the Cole process is designed to produce a write head having a well-defined pole tip region, the process does not perform well in a manufacturing environment. A principal difficulty with the Cole approach resides in the single-step ion milling process that requires continuous milling into and through diverse materials of the magnetic material of the upper pole extension, the gap material and the magnetic material of the lower pole extension. The different materials have different mill rates, making control of the milling process difficult in a manufacturing environment. The heads are typically formed on wafers, forming many hundreds of heads from each wafer. Variations in layer formation techniques in different regions of the wafer often leads to minor variations in thicknesses of the layers in different regions and in different heads being fabricated. Variation in layer thickness affects the milling time of the ion milling process; thicker layers require a longer milling time than thinner layers of the same material. Where a buried layer, such as Cole's gap layer and lower pole extension, is of a different material (and therefore has a different mill rate than a layer above), thickness variations of the layers alter the time of beginning of milling the buried layer and the time of beginning milling the layer below the buried layer. As a result, milling of the buried layers (both the gap and the lower pole extension) is inconsistent. Hence, the Cole process is not altogether satisfactory in a manufacturing environment.

Another difficulty resides in the fact that Cole employs a metal oxide gap, such as alumina, that can only be deposited by sputter-deposition or vapor deposition, and cannot be formed by plating. Therefore, Cole requires formation of the bottom poles by plating, and a process change to sputter or vapor deposit the gap, and then change again to form the top pole extension by plating. Cole's process changes limits Cole's process to formation of layers that are without precise geometric configuration, and subsequent patterning by etching or milling, as Cole does.

There is, accordingly, a need for a process of forming an inductive thin film write head having well-defined pole tip elements, that avoids process changes and milling procedures of buried layers.

As used herein, the term "gap width" refers to the width of the gap across the air bearing surface of the head coincident with the width of the track being recorded. "Gap length" refers to the length of the gap along the air bearing surface between the poles, along the length of the track being recorded. "Gap depth" refers to the depth of the gap from the air bearing surface to a point (sometimes called the zero throat level) where both poles first confront the gap distal from the air bearing surface.

BRIEF SUMMARY OF THE INVENTION

The present invention is directed to a process of forming an inductive magnetic transducer for a recording head in which the magnetic material of the lower pole extension, a metal gap material, and the magnetic material of the top pole extension are plated in a single mask, which is thereafter removed leaving a well-defined pole/gap/pole sandwich in the pole tip region with a precisely defined surface at the zero throat level, without a milling process.

In one embodiment of the invention, a first layer of magnetic material is deposited onto a substrate to form a bottom pole of the transducer. In one form, the bottom pole is a shared pole with a magnetoresistive read head which forms the substrate on which the pole is formed. Where a magnetoresistive head is included, a protective layer is formed over a portion of the bottom pole layer in the region of the coil region of the inductive head. In either case, this embodiment employs a layer of photoresist is formed on the first layer of magnetic material (and on the protective layer, if employed) that is patterned to define a mask that defines the width and the zero throat level of the pole tip region for the transducer, the mask exposing the first layer of magnetic material within the pole tip region. Using the mask, a second layer of magnetic material is plated on the first layer of magnetic material within the pole tip region to form a bottom pole extension, a layer of non-magnetic (low permeability) metal is then plated on the bottom pole extension to form the gap, and a third layer of magnetic material is then plated on the gap layer to form the top pole extension. The photoresist mask is then removed leaving the first layer of magnetic material (and protective layer, if employed) at the back region of the transducer behind the zero throat level of the pole tip region, and the bottom pole extension, gap and top pole extension at the pole tip. The mask defines a good surface to the pole extensions and gap at the zero throat level. Thereafter, the coil and top pole are formed in a conventional manner, with the top pole joining the top pole extension in the pole tip region and the bottom pole in the back region distal from the pole tip region.

A second embodiment of the invention avoids the mask. In this second embodiment, a first layer of magnetic material is deposited onto a substrate to form a bottom pole of the transducer, and a first layer of insulating material is deposited onto the first layer of magnetic material in the coil region of the transducer behind the pole tip region. A gap region is deposited on the first layer of magnetic material within the pole tip region and abutting the first layer of insulating material. The gap region comprises a second layer of magnetic material to form a bottom pole extension, a layer of non-magnetic metal, and a third layer of magnetic material to form a top pole extension. A coil region is formed on the first layer of insulating material and comprises at least a portion of a conductive coil within an insulator. Formation of the coil region leaves a portion of the first layer of magnetic material distal from the pole tip region exposed. A third layer of magnetic material is formed over the exposed portions of the first layer of magnetic material, the gap region and the coil region to form a top pole of the transducer.

DETAILED DESCRIPTION

Figure 1:
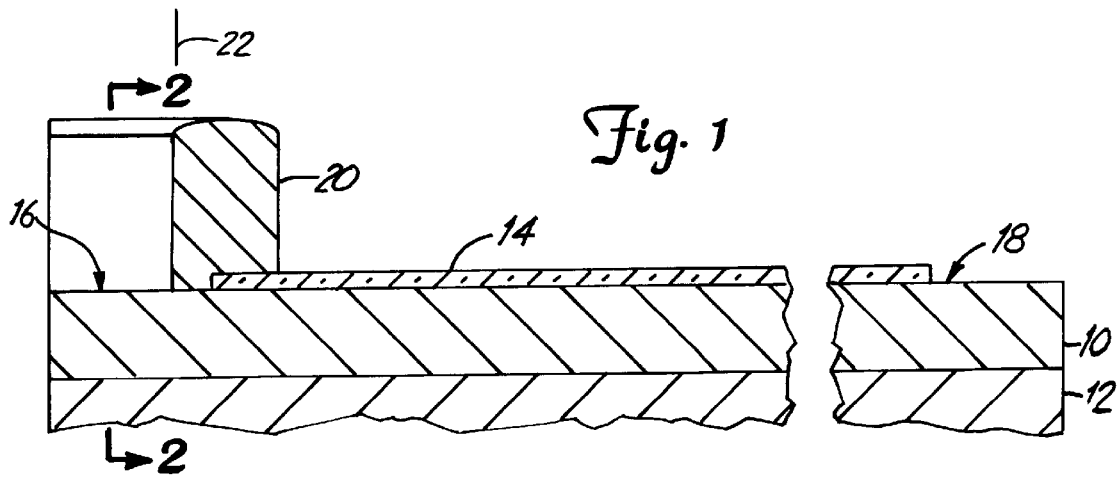
FIG. 1 is a section view illustrating one stage of the construction of an inductive thin-film magnetic head in accordance with the process of the present invention.
Figure 2:
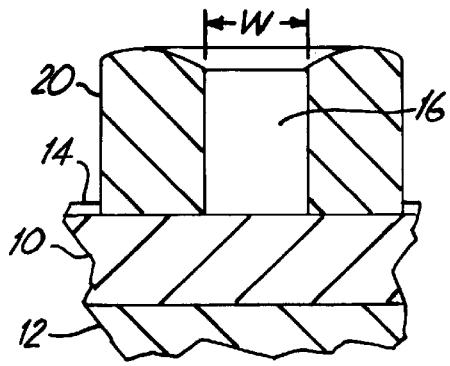
FIG. 2 is a section view taken at line 2—2 in FIG. 1.
Figure 3:
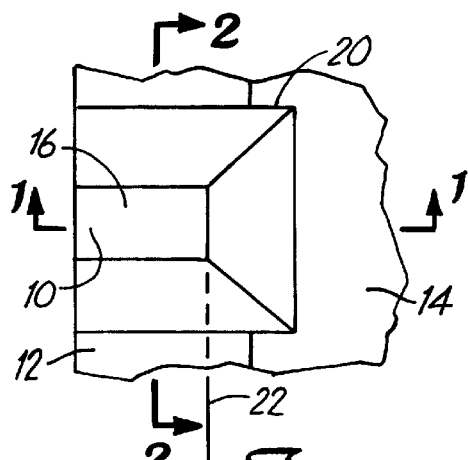
FIG. 3 is a top view of a portion of the head illustrated in FIG. 1, FIGS. 1 and 2 being taken at lines 1—1 and 2—2, respectively in FIG. 3.

FIGS. 1–8 illustrate a process of forming a thin-film inductive write head according to a first embodiment of the present invention. As shown at FIGS. 1–3, a layer 10 of magnetic material, such as permalloy, is formed on substrate 12. Layer 10 will form the lower pole piece of the thin-film inductive magnetic transducing head being fabricated. In one form of the invention, the inductive write transducer may be a part of a read/write head employing a magnetoresistive (MR) read head (not shown in FIGS. 1–3). In such a case, substrate 12 may be a reader isolation layer formed of a metal oxide such as alumina or silicon dioxide, and layer 10 will serve the dual function as a shield for the MR head, as well as the bottom pole for the inductive head. Thus, layer 10 is known in the trade as a shared pole. If desired, a protective layer 14 is formed on the exposed surface of magnetic layer 10, and is patterned as to expose the top surface of layer 10 in a region that encompasses pole tip region 16 and back gap region 18. By way of example, layer 14 may be a metal oxide, such as alumina, that is sputter-deposited onto the exposed surface of layer 10 and etched, using a photoresist mask and etchant, to expose layer 10 at the back gap region 18 and pole tip region 16. Layer 14 does not extend into pole tip region 16.

Photoresist mask 20 is formed on the exposed surfaces of layers 10 and 14 and patterned to expose an upper surface of layer 10 in pole tip region 16. As shown particularly in FIGS. 1 and 2, mask 20 defines the width and depth of pole tip region 16 to the zero throat level 22. Conveniently, mask 20 may be a U-shaped mask, defining the pole tip width and depth (to zero throat level 22), leaving the upper surface of the remainder of protective layer 14 and magnetic layer 10 exposed.

Figure 4:
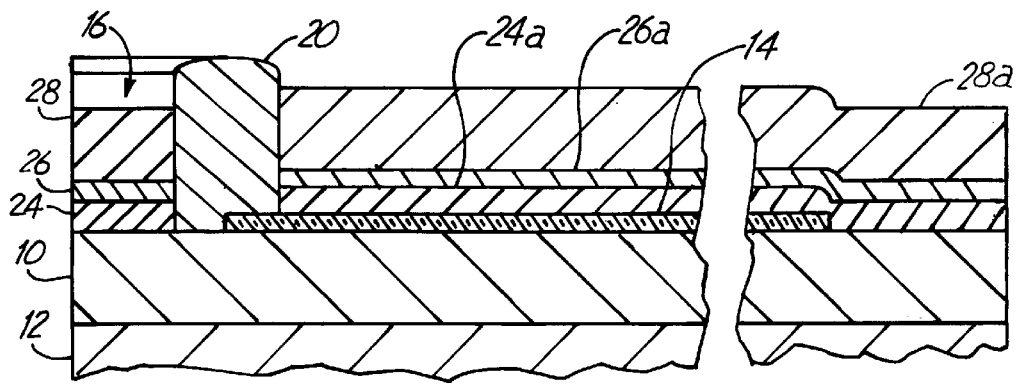
FIGS. 4–8 are section views, as in FIG. 1, illustrating successive steps in the process of forming the thin-film inductive head in accordance with one embodiment of the present invention.

As shown in FIG. 4, a layer of magnetic material, such as permalloy, is plated on the exposed portions of the shared pole on each side of mask 20 as magnetic layer portions 24 and 24a over layer 10 in pole tip region 16 and over protective layer 14. Next, a layer of non-magnetic (low permeability) metal gap material is plated over layer 24, 24a on each side of mask 20 as gap material portions 26 and 26a. The metal of gap layer 26, may be any non-magnetic metal, such as lead, gold, lead-nickel alloy, nickel-phosphorous alloy, or nickel-chromium alloy. Finally, another layer of magnetic material, such as permalloy, is plated over layer 26, 26a on each side of mask 20 as magnetic portions 28 and 28a. An important feature of the invention resides in the fact that the three layers, 24, 26 and 28 are self-aligned by a plating technique, such as electroplating or electroless plating.

Figure 5:
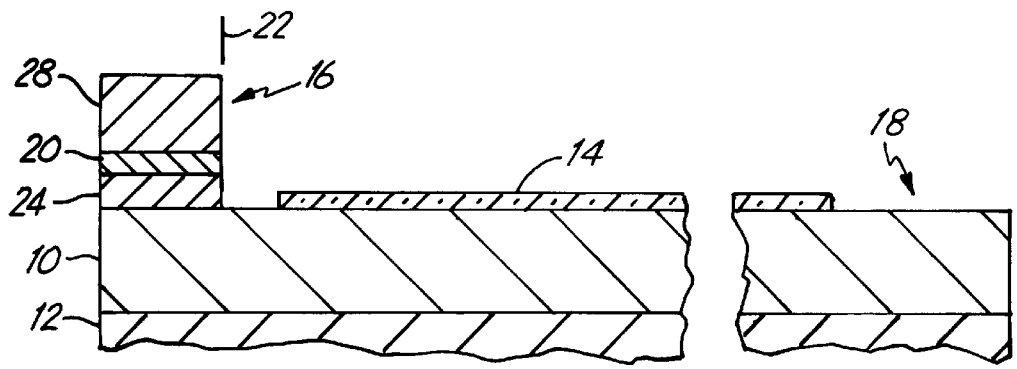

As illustrated in FIG. 5, mask 20 is removed, as are the portions 24a, 26a and 28a of the magnetic layers and gap layer in the back region of the head, including over back gap 18, leaving the structure illustrated in FIG. 5. Portions 24a, 26a and 28a need only be removed to such a level as to assure magnetic connection between top pole 36 and bottom pole 10 at back gap 18. Thus, if removal of layers 24a, 26a, and 28a is accomplished by an etching process, the etching may occur to a level that either leaves a portion of magnetic layer 24a at the back gap, or etches into bottom pole 10 at the back gap. More preferably, portions of layers 24a, 26a and 28a are left in place in region 18 and those portions of layers 26a and 28a are etched away before forming the top pole. In either case, good magnetic connection between the top and bottom poles is assured at the back gap to assure a good magnetic circuit.

Figure 6:
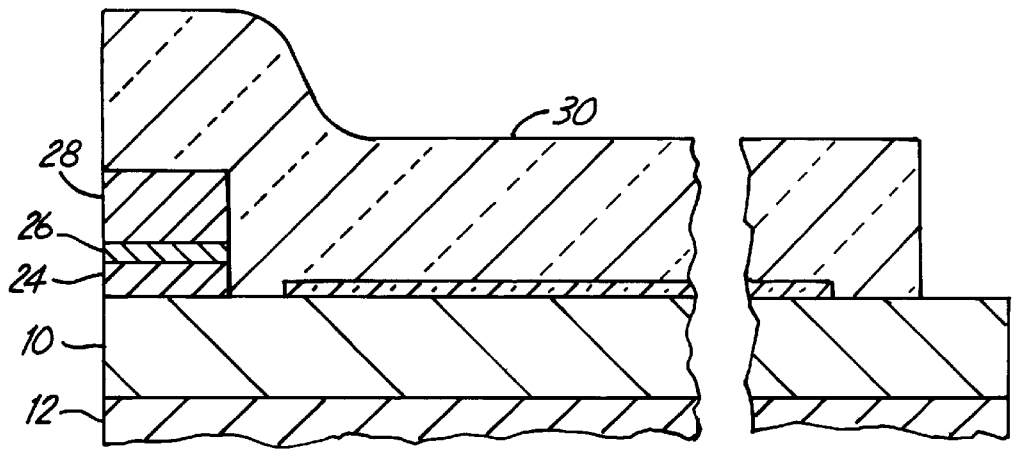
Figure 7:
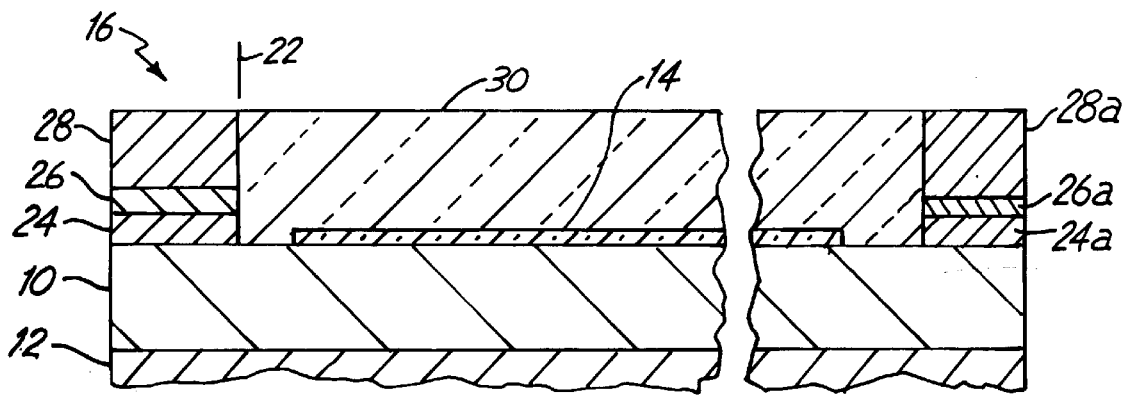
Figure 8:
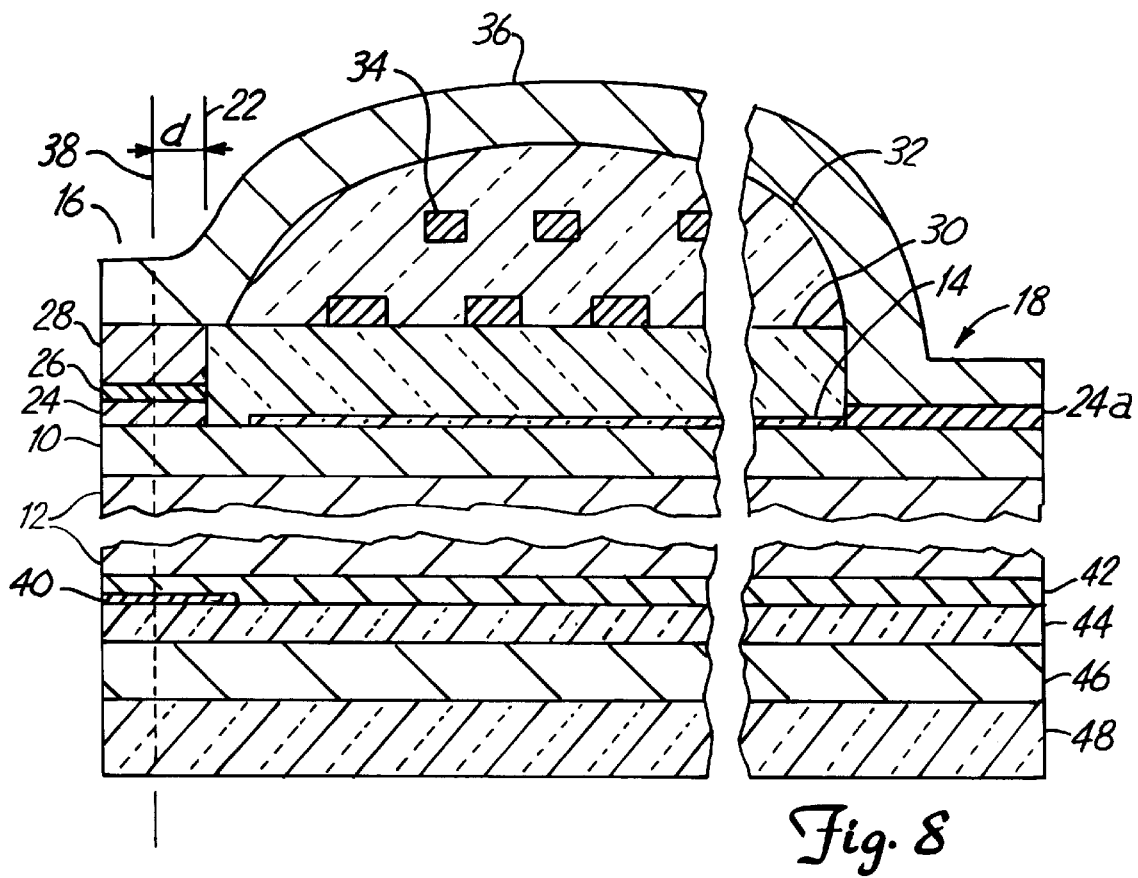

Next, and as illustrated particularly in FIGS. 6–8, the insulator and coil structure are formed in the back region of the head and comprise layers of insulating material 30, 32 encapsulating convolutions 34 of an electric coil, with a top magnetic pole 36, preferably formed of permalloy, plated over the structure and joined to the exposed surface of top pole extension 28 in the pole tip region 16, and to the exposed surface of bottom pole 10 in the back gap region 18. In a first embodiment of the process, the coil structure is formed by depositing a layer 30 of insulating material, such as metal oxide, onto the exposed surfaces of top pole extension 28, protective layer 14 and shared pole 10 between the pole tip region 16 and protective layer 14 as shown in FIG. 6. Layer 30 is then ground to a planar surface to expose a top surface of top pole extension 28, as shown in FIG. 7. This grinding step may also grind away a small amount of top pole extension 28 to assure a planar surface to the upper surface of both insulation layer 30 and top pole extension 28. As shown in FIG. 7, the alternative of leaving a portion of layers 24a, 26a and 28a is illustrated. These layers serve to protect lower layers, such as an MR transducer, during fabrication of the inductive transducer in much the same manner as layer 14. After grinding the structure as illustrated in FIG. 7, those portions remaining of layers 26a and 28a are etched away, leaving magnetic layer 24a at the back gap region 18. As shown in FIG. 8, additional insulation layer(s) 32 encapsulates portions of convolutions 34 of a coil, and top pole piece 36 is formed over the coil region and the bottom pole 10 or magnetic extension layer 24a at region 18.

After completion of the inductive magnetic head according to the present invention, the forward surface is lapped and polished to form an air bearing surface defined at 36, thereby establishing a precise depth d to the pole tip region.

As shown in FIG. 8 the MR head which includes an MR element 40 connected by contacts 42 to external read circuits (not shown). Typically, a metal oxide layer 44, such as alumina, is sandwiched between the MR element 40 and contacts 42 on one side and a second magnetic shield layer 46 on the other. The entire structure may be supported on an insulating substrate 48. Additionally, the MR head may additionally include a boundary control stabilization layer, a permanent magnet stabilization layer and/or additional layers of contacts for inductive cancellation and/or low circuit resistance.

Figure 9:
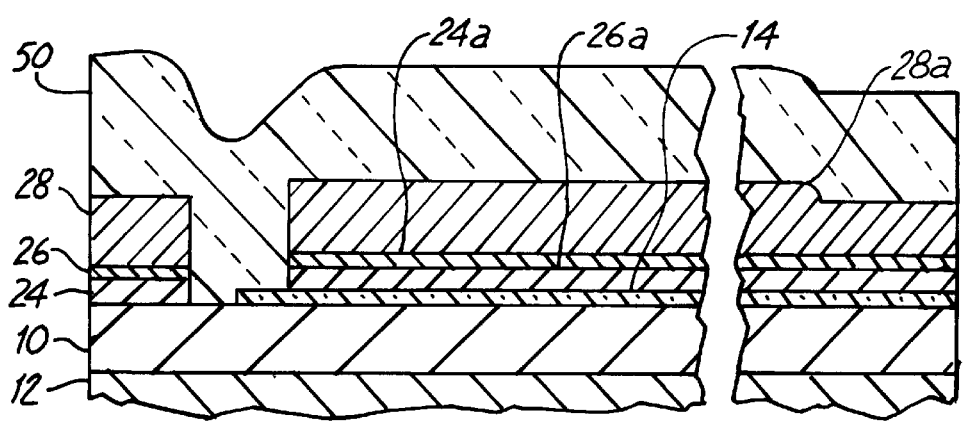
FIGS. 9–13 are section views, as in FIG. 1, illustrating successive steps in the process of forming a thin-film inductive head in accordance with a second embodiment of the present invention.
Figure 10:
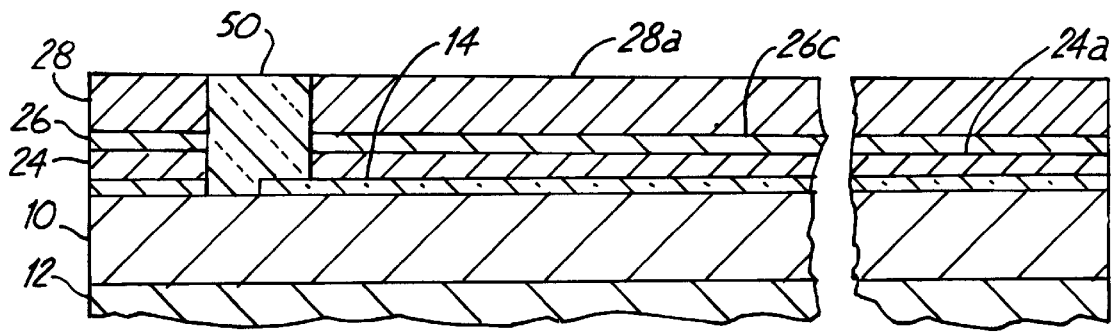
Figure 11:
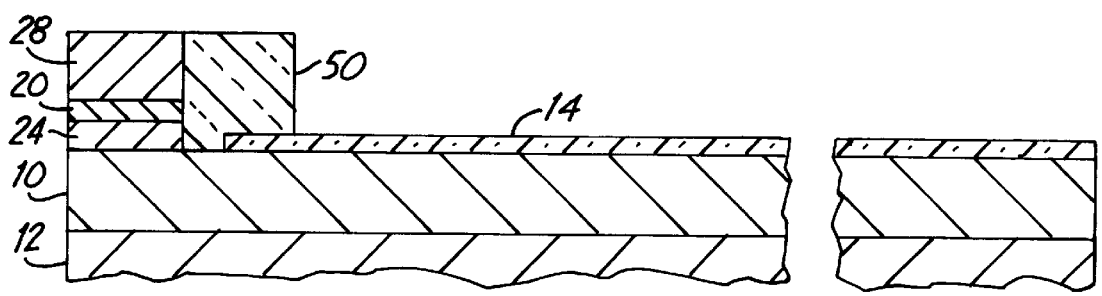
Figure 12:
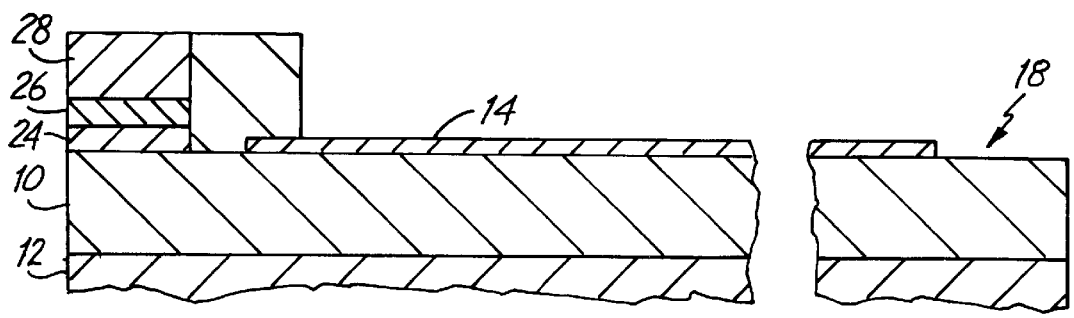
Figure 13:
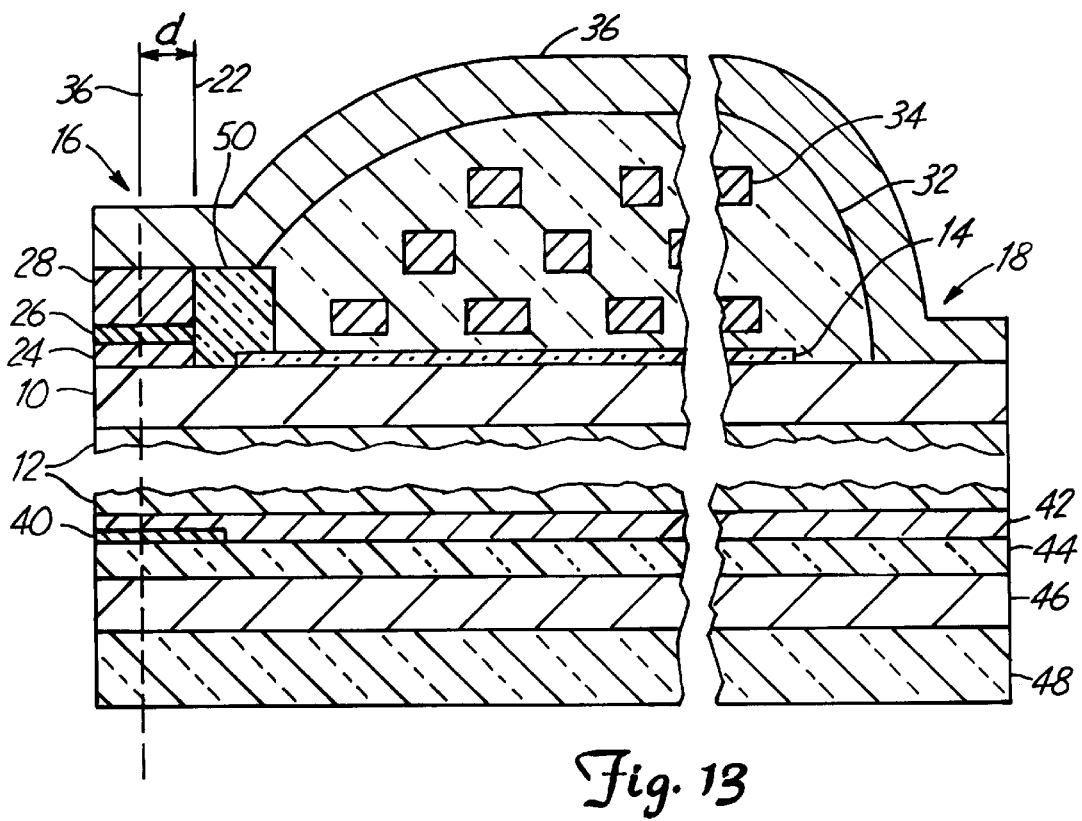

The embodiment described in connection with FIGS. 1–8 forms a planar coil design wherein the coils are formed starting with the same plane as the interface between the top pole piece and the top pole extension. FIGS. 9–13 illustrate a second embodiment of the invention producing a recessed pole design. The structure of FIG. 4 is fabricated as described, except that protective layer 14 extends though the back gap region 18. Mask 20 is removed, leaving layers 24a, 26a, and 28a. As shown in FIG. 9, a layer 50 of metal oxide, such as alumina, is deposited over the structure and into the region left by mask 20. The structure is ground smooth as shown in FIG. 10, and layers 24a, 26a and 28a are removed as described above, leaving the structure illustrated in FIG. 11 with the layer 14 of protective material extending through the back gap region 14. Next, as shown in FIG. 12, layer 14 is etched away at back gap region 18 to expose bottom pole 10, and, as shown in FIG. 13, layer(s) 32 of insulation encapsulate convolutions 34 of the coil, and top pole piece 36 is formed as previously described. Again, the structure is lapped and polished to form air bearing surface 38.

Figure 14:
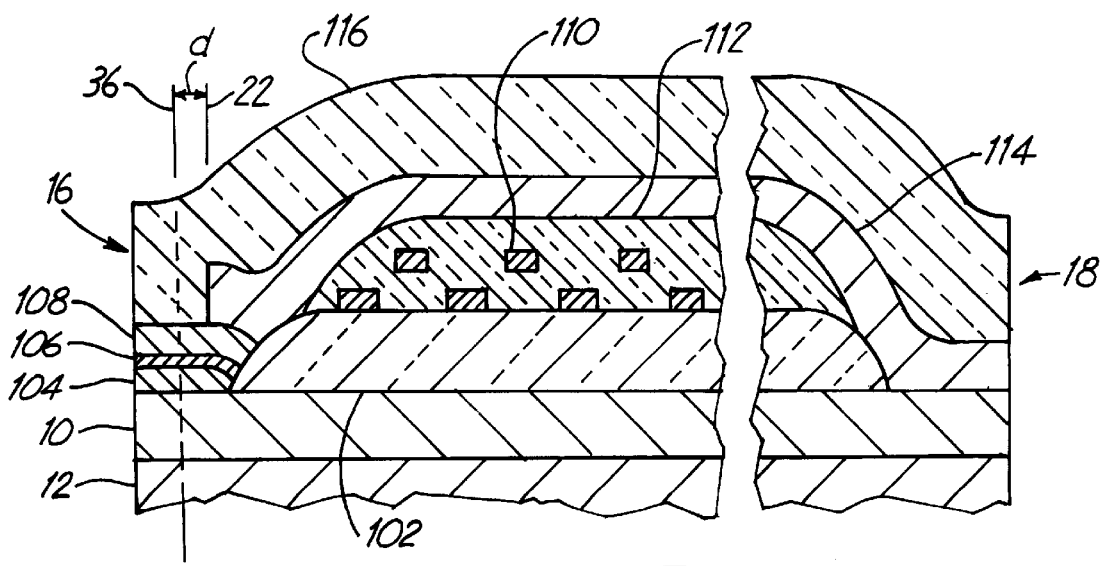
FIG. 14 is a section views, as in FIG. 1, illustrating the process of forming a thin-film inductive head in accordance with a third embodiment of the present invention.

FIG. 14 illustrates a third embodiment of the present invention wherein the several layers are formed without mask 20. A layer 102 of metal oxide insulating material, such as alumina, is deposited in a pattern over common pole 10 in the gap region between pole tip region 16 and back gap region 18. A layer of bottom pole extension material 104 is plated on the exposed surface of common pole 10 in pole tip region 16, a layer of metal gap material 106 is plated on the exposed surface of layer 104, and a layer of top pole extension material 108 is plated on the exposed surface of layer 106. The coil structure comprising convolutions 110 embedded in insulating material 112 is formed over insulating layer 102, and a top pole layer 114 is formed over at least a portion of the exposed top pole extension 108 within the pole tip region, insulating material 112 within the coil region, and common pole 10 within the back gap region. The entire structure may be encapsulated in insulating cap 116. The structure illustrated in FIG. 14 provides a smooth rear surface to the pole extensions and gap, due to the common surface with layer 102.

One feature of the process of FIG. 14 resides in the fact that the insulating layer 102 serves as both the smooth stop for the formation of the pole extensions and gap layer in the pole tip region and a protective layer for an adjacent MR read transducer (not show in FIG. 14) below the write transducer.

Top pole layer 114 might be wider (across the gap width) than top pole extension 108, in which case it is preferred that top pole layer 114 does not extend to air bearing surface 36, thereby avoiding sharp corners in the magnetic path at the junction between top pole layer 114 and top pole extension 108 at or near the air bearing surface. Sharp corners in the magnetic circuit tend to promote flux leakage, leading to degraded head performance. Alternatively, top pole layer 114 may extend to the air bearing surface with a width preferably smaller than the width of extension 108.

The present invention thus provides a highly efficient, repetitive process for precise fabrication of the pole tip region of a thin-film inductive magnetic head that avoids difficulties associated with ion milling, and does not require process alteration during fabrication. Although the present invention has been described with reference to preferred embodiments, workers skilled in the art will recognize that changes may be made in form and detail without departing from the spirit and scope of the invention.

We claim:

1. A process of forming an inductive magnetic transducer for a recording head comprising:

depositing a first layer of magnetic material onto a substrate to form a bottom pole of the transducer;

patterning a layer of photoresist on the first layer of magnetic material to define a mask that defines a width and zero throat level of a pole tip region for the transducer, the mask exposing the first layer of magnetic material within the pole tip region;

plating a gap region on the first layer of magnetic material within the pole tip region, the gap region comprising a layer of non-magnetic metal and a second layer of magnetic material;

removing the photoresist mask to expose the first layer of magnetic material at a back region of the transducer behind the zero throat level of the pole tip region;

forming a coil region comprising at least a portion of a conductive coil within an insulator over the first layer magnetic material in the back region, the formation of the coil region leaving exposed a portion of the first layer of magnetic material distal from the pole tip region; and forming a third layer of magnetic material over the exposed portions of the first layer of magnetic material, the gap region and the coil region to form a top pole of the transducer, the second layer of magnetic material forming a pole extension for one of the bottom and top poles, and the layer of non-magnetic metal forming a transducing gap for the transducer.

2. The process of claim 1, wherein the plating steps are performed by a process selected from the group consisting of electroplating and electroless plating.

3. The process of claim 1, wherein the non-magnetic metal is selected from the group consisting of lead, gold, lead-nickel alloys, nickel-phosphorous alloys and nickel-chromium alloys.

4. The process of claim 1, wherein the plating of the gap region is performed by plating the second layer of magnetic material on the first layer of magnetic material within the pole tip region, plating the layer of non-magnetic metal on the second layer of magnetic material, and plating a fourth layer of magnetic material on the layer of non-magnetic metal.

5. The process of claim 4 wherein the coil region is formed by depositing a first insulating layer on the first layer of magnetic material at the back region of the transducer behind the zero throat level of the pole tip region, planarizing the first insulating layer and gap region, and forming a conductive coil structure having portions of convolutions embedded in a second insulating layer on the exposed first insulating layer.

6. The process of claim 4 wherein the layer of photoresist is patterned to expose a portion of the first layer of magnetic material at the back region of the transducer behind the zero throat level of the pole tip region, and the step of plating the gap region within the pole tip region also plates the layer of non-magnetic metal and the second and fourth layers of magnetic material on the exposed first layer of magnetic material in the back region, wherein the coil region is formed by depositing a first insulating layer on the first layer of magnetic material at the back region of the transducer behind the zero throat level of the pole tip region, planarizing the first insulating layer and gap region, removing the layer of non-magnetic metal and the second and fourth layers of magnetic material from the back region, and forming a conductive coil structure having portions of convolutions embedded in a second insulating layer on the exposed first layer of magnetic material in the back region.

7. The process of claim 1 wherein the coil region is formed by depositing a first insulating layer on the first layer of magnetic material at the back region of the transducer behind the zero throat level of the pole tip region, planarizing the first insulating layer and gap region, and forming a conductive coil structure having portions of convolutions embedded in a second insulating layer on the exposed first insulating layer.

8. The process of claim 1 wherein the layer of photoresist is patterned to expose a portion of the first layer of magnetic material at the back region of the transducer behind the zero throat level of the pole tip region, and the step of plating the gap region within the pole tip region also plates the layer of non-magnetic metal and second layer of magnetic material on the exposed first layer of magnetic material in the back region, wherein the coil region is formed by depositing a first insulating layer on the first layer of magnetic material at the back region of the transducer behind the zero throat level of the pole tip region, planarizing the first insulating layer and gap region, removing the layer of non-magnetic metal and second layer of magnetic material from the back region, and forming a conductive coil structure having portions of convolutions embedded in a second insulating layer on the exposed first layer of magnetic material in the back region.

9. The process of claim 1 further including:

forming a magnetoresistive read transducer on a substrate, the magnetoresistive read transducer having an insulating top layer, the step of depositing the first layer of magnetic material comprises depositing the first layer of magnetic material on the insulating top layer to form a common shield layer for the magnetoresistive read transducer and a bottom pole for the inductive magnetic transducer.

10. A process of forming an inductive magnetic transducer for recording head comprising:

depositing a first layer of magnetic material onto a substrate to form a bottom pole of the transducer;

depositing a first layer of insulating material onto the first layer of magnetic material in a coil region of the transducer behind a pole tip region;

plating a gap region on the first layer of magnetic material within the pole tip region and abutting the first layer of insulating material, the gap region comprising a layer of non-magnetic metal and a second layer of magnetic material;

forming a coil region comprising at least a portion of a conductive coil within an insulator over the first layer of insulating material, the formation of the coil region leaving exposed a portion of the first layer of magnetic material distal from the pole tip region; and forming a third layer of magnetic material over the exposed portions of the first layer of magnetic material, the gap region and the coil region to form a top pole of the transducer, the second layer of magnetic material forming a pole extension for one of the bottom and top poles, and the layer of non-magnetic metal forming a transducing gap for the transducer.

11. The process of claim 10, wherein the plating steps are performed by a process selected from the group consisting of electroplating and electroless plating.

12. The process of claim 10, wherein the non-magnetic metal is selected from the group consisting of, gold, lead-nickel alloys, nickel-phosphorous alloys and nickel-chromium alloys.

13. The process of claim 10, wherein the plating of the gap region is performed by plating the second layer of magnetic material on the first layer of magnetic material within the pole tip region, plating the layer of non-magnetic metal on the second layer of magnetic material, and plating a fourth layer of magnetic material on the layer of non-magnetic metal.

14. The process of claim 10, further including:

forming a magnetoresistive read transducer on a substrate, the magnetoresistive read transducer having an insulating top layer, the step of depositing the first layer of magnetic material comprises depositing the first layer of magnetic material on the insulating top layer to form a common shield layer for the magnetoresistive read transducer and a bottom pole for the inductive magnetic transducer.

* * * * *